United States Patent Office 2,991,567
Patented July 11, 1961

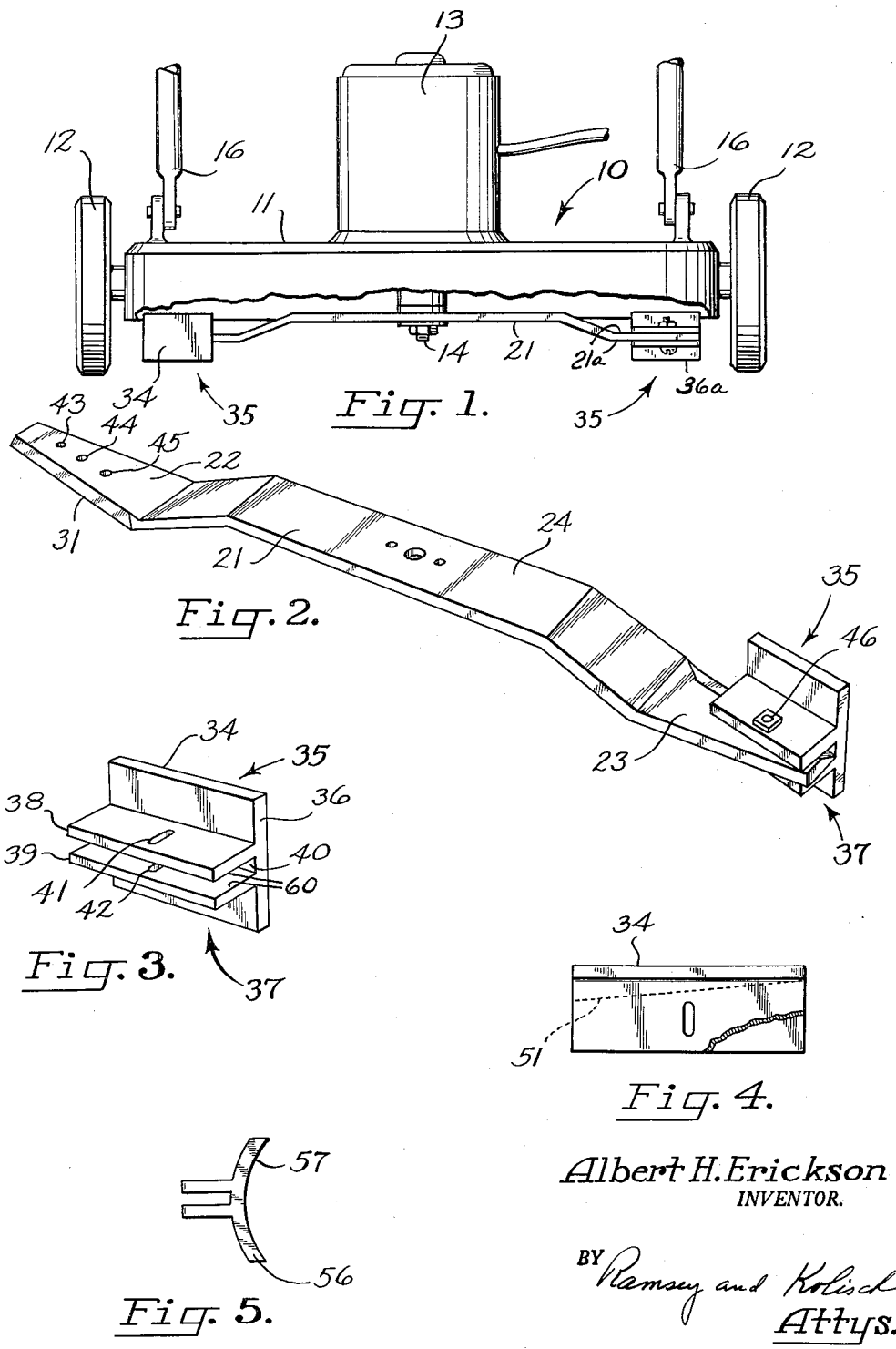

2,991,567
ATTACHMENT FOR ROTARY SICKLE TYPE LAWNMOWERS
Albert H. Erickson, 432 E. Main St., Hillsboro, Oreg.
Filed May 12, 1958, Ser. No. 734,538
4 Claims. (Cl. 37—43)

This invention relates to rotary sickle type lawnmowers, and more particularly to an attachment for such a mower operable to convert it into a highly effective snow removal device.

A principal object of the invention is to provide an attachment for sickle type mowers which is readily secured to the rotating sickle bades of a mower, and which after attachment operates to generate a centrifugal blowing action in substantially a horizontal plane for the removal of snow. The attachment shields the leading or cutting edges of the sickle or cutting bar of a mower from damage. Further the attachment produces along lower edge portions thereof a plowing action which functions first to scrape and then throw up wet or packed snow into the air draft generated by the attachment.

In general terms, this invention contemplates a blower blade head which is detachably secured to each of the rotating ends of a cutter bar in a mower. The blower head is provided with an upright plate portion having a forward blower face carried in front of the leading or cutting edge of the cutter bar end. The blower plate portion extends above and below the top and bottom faces of a cutter bar, with the lower edge thereof acting as a scraping edge. Rearwardly of the blower plate portion there is provided a bifurcated clamp portion comprising a pair of vertically spaced flanges which fit over top and bottom faces of a cutter bar with the cutting or leading edge of the bar held snugly against a wall spanning the space between the flanges.

The blower plate portion and spaced flanges effectively shield the cutting edge of a cutter bar. Ordinarily a mower will travel over the ground with the cutter bar rotating in a plane spaced only a short distance above the ground. Fallen snow frequently has embedded therein rocks and other foreign matter, and for this reason the shielding action of the blade head is most important.

In an embodiment of the invention, it is contemplated that the blower face of the upright plate portion be carried at an acute angle relative to a radial line projecting outwardly from the rotation axis of the cutter bar and passing through the blower face. The inner forward edge of the blower face is positioned forwardly of its outer forward edge, and the resulting incline of the blower face tends to spin material outwardly off the blower face on rotation of the cutter bar.

The invention is discussed hereinbelow in conjunction with the accompanying drawings wherein:

FIG. 1 is a front view of a sickle type, rotary mower having a rotatable cutter bar equipped with a pair of blower head attachments as contemplated by this invention;

FIG. 2 is a perspective view of a cutter bar removed from a mower and further illustrating a blower head attachment;

FIG. 3 is a perspective view of an attachment prior to its mounting on a cutter bar;

FIG. 4 is a plan view of a modification of the invention; and

FIG. 5 is a side elevation of another form of the invention.

Referring now to the drawings, and in particular to FIGS. 1 and 2, 10 indicates generally a rotary, sickle type lawnmower of conventional design. The lawnmower comprises a mobile frame 11 supported by wheel supports 12. Located on top of the mower frame 11 is an electric motor 13, which, on energizing of the motor, rotates a vertical, power driven shaft 14. The mower is guided over the ground by a pivotally mounted handle having a bifurcated lower end and partially shown at 16.

Fixed to the bottom end of shaft 14 is an elongated cutter bar 21. This cutter bar is shown with end portions 22 and 23 carried at a lower level than a middle mounting portion 24. It should be understood that the particular configuration of a cutter bar, and the number employed, will vary, depending upon the manufacturer of the mower and its source. In the embodiment illustrated, the mower has a single cutter bar with opposite end portions revolving about the rotation axis of shaft 14. This is a common type of design. The cutter bar is supported centrally between its ends on shaft 14 so that on rotation of the bar, the bar is dynamically balanced.

For the sake of simplicity, an electrically driven rotary mower is illustrated which is propelled manually over the ground. The invention is applicable to other types of mowers, as for instance mowers which are driven by combustion engines, or those in which the frame is supported by power propelled support wheels. In general all the mowers are characterized by the presence of revolving cutter bars revolving in a horizontal plane and supported by the mower frame at an elevation spaced a short distance above the ground. The cutter bars are rotated at relatively high speeds, and produce a sickle type cutting action.

End portions 22 and 23 of cutter bar 21, which constitute cutter blades in the mower, are flat and lie in substantially a horizontal plane. The lead or cutting edges of the end portions usually are sharpened, as at 31. Frequently, as shown best in FIG. 2, the cutting edges lie at an acute angle with respect to radial lines projected outwardly from the rotation axis for the bar and intercepting the cutting edges.

The blade attachments or blower blade heads of this invention are indicated at 35. Two are shown, one on each end of the cutter bar. Each comprises a bory having an upright blower plate portion 36 with a forward pusher or blower face 34, and extending rearwardly of the upright plate portion, a bifurcated clamp portion 37 integral with plate portion 36. In the embodiment illustrated, forward face 34 has substantially a rectangular outline. The blower heads are secured to cutter bar 21 with the lower edges 36a of plate portions 36 occupying a common horizontal plane spaced vertically below the cutter bar. These lower edges act as scraping edges 36a.

Upright plate portion 36 is joined substantially at right angles to bifurcated clamp portion 37. Thus when the clamp portion is secured to a horizontal end portion 22, 23 of the cutter bar, the plate portion occupies an upright position.

Clamp portion 37 comprises a pair of spaced, opposed flanges 38, 39. These are fitted over top and bottom faces 21a of the cutter bar. The inner faces 60 of the flanges are joined along their inner edges by wall portion 40 spanning the space between the flanges. Wall 40 and the inner faces of flanges 38, 39 define a channel covering a forward or cutting edge of a bar. When mounted on a cutter bar, wall 40 abuts a cutting edge and maintains the blade head in proper alignment with the bar.

Extending through flanges 38 and 39 are mutually aligned elongated slots 41, 42. To attach a blower head to a cutter bar, a bolt 46 is threaded through the slots, and one of a series of accommodating bores 43, 44, 45 provided in each end of the cutter bar. The plural number of bores provided at each end of bar 21 accommodate adjustment of the position of the blower head longitudinally of a bar. The provision of slots in flanges 38, 39 enable the positioning of a blower head so that wall 40 tightly abuts a cutting edge.

In the embodiment shown in FIG. 2, cutter bar 21 has cutting edges arranged at acute angles relative to radial lines passing through the cutting edges and projected radially outwardly from the rotation axis of the cutter bar. Thus a blower head having a wall 40 parallel to face 34 of the head, when mounted over a cutting edge of a cutter bar, will also have a face portion disposed at an acute angle relative to such radial lines. With cutter bars which have cutting edges arranged at an obtuse angle relative to such radial lines, blower heads according to the embodiment illustrated in FIG. 4 may be used.

In this figure, a wall 51 joins the inner faces of flanges 38, 39 which is angularly disposed with respect to blower face portion 34. The angle of wall 51 may be selected to compensate for the angle of a cutting edge, and to give the desired incline to the face portion of the blower head. In most instances a face portion arranged at an acute angle relative to such radial lines is desirable, as better throw-off of material from the face of the plate portion is realized.

In the embodiment of FIG. 5 a plate portion 56 having a concave forward face 57 is shown. The concavity of the forward face produces a scooping action which throws snow up into the air draft created by the blower heads. This configuration is particularly useful in handling wet or packed snow.

The blower blade heads on the opposite ends of a cutter bar are of the same shape and mass, and equally spaced from the bar center. In this way the dynamic balance of the cutter bar is maintained.

Preferably the blower blade heads are made of a light rigid material, such as aluminum or the like. A light material is preferred, so as not to build up too much mass in the cutter bar, and not to disturb the dynamic balance of the bar to a great degree should there be slight irregularities between the two blower heads mounted at opposite ends of a bar.

It is claimed and desired to secure by Letters Patent:

1. In a lawnmower having a mobile frame and a power driven rotatable cutter bar mounted on said frame with end portions rotatable in a horizontal plane, a detachable blade head mounted on each end portion of said cutter bar, and means securing each blade head to said cutter bar, said last-mentioned means accommodating adjustment in the position of the blade head along the length of the cutter bar, each blade head having an uprightly arranged blower face portion carried in advance of and extending above and below the end portion mounting the blade head, and surface portions defining an elongated channel mounted in covering relation over forward portions of the cutter bar.

2. In a lawnmower having a mobile frame and a power driven rotatable cutter bar mounted on said frame, said cutter bar having a flat substantially horizontal end portion rotatable in substantially a horizontal plane, said end portion having upper and lower faces, the improvement comprising a blade head portion detachably secured to said end portion, said blade head portion comprising an upright blower face portion having upper and lower edges and carried in advance of the cutter bar and a bifurcated clamp portion extending rearwardly of said blower face portion, said bifurcated clamp portion comprising a pair of oppositely disposed flanges disposed intermediate the upper and lower edges of said blower face portion, said flanges fitting over the upper and lower faces of said end portion.

3. In a lawnmower having a mobile frame and a power driven cutter bar rotatable about a rotation axis mounted on said frame, said cutter bar having a flat substantially horizontal end portion with upper and lower faces and a lead edge rotatable in substantially a horizontal plane, a blade head portion detachably secured to said end portion over the lead edge thereof, said blade head portion comprising an upright blower face portion having upper and lower edges and inner and outer edges carried in advance of said lead edge and a bifurcated clamp portion having a pair of oppositely disposed flanges extending rearwardly of said blower face portion at an elevation spaced intermediate the upper and lower edges of said blower face portion, said flanges fitting over the upper and lower faces of said end portion, said flanges having inner faces with inner edges and being joined along their inner edges by an upright wall portion held in abutting relation with the lead edge of said end portion, said blower face portion being disposed at an acute angle relative to a radial line passing therethrough projecting outwardly from the rotation axis of said cutter bar and with its inner edge held forwardly of its outer edge.

4. In a lawnmower having a mobile frame and a power driven cutter bar rotatable about a rotation axis mounted on said frame, said cutter bar having flat substantially horizontal end portions rotatable in a horizontal plane, a detachable blade head mounted on each end portion of said cutter bar and having upper and lower and inner and outer edges, said blade head having an uprightly arranged pusher face portion carried in advance of and extending above and below the end portion that mounts the blade head, said pusher face portion being disposed at an acute angle relative to a radial line passing therethrough projecting outwardly from the rotation axis of said cutter bar and with its inner edge held forwardly of its outer edge.

References Cited in the file of this patent

UNITED STATES PATENTS

| | | |
|---|---|---|
| 1,601,718 | Buttweiler | Oct. 5, 1926 |
| 2,118,851 | McCallum | May 31, 1938 |
| 2,353,094 | Veneziano | July 4, 1944 |
| 2,437,116 | Oppegaard | Mar. 2, 1948 |
| 2,706,441 | Caldwell et al. | Apr. 19, 1955 |
| 2,752,699 | Gustafson | July 3, 1956 |
| 2,777,270 | Colclazier | Jan. 15, 1957 |
| 2,863,162 | Draughon | Dec. 9, 1958 |